United States Patent [19]

Okuyama et al.

[11] Patent Number: 5,070,280
[45] Date of Patent: Dec. 3, 1991

[54] DEFLECTION YOKE

[75] Inventors: Nobutaka Okuyama; Soichi Sakurai; Kouji Kitou, all of Yokohama; Michitaka Ohsawa, Fujisawa; Ichiro Niitsu, Yokohama; Hiroshi Yoshioka, Mobara; Atushi Takeyama, Odawara; Masao Obara, Yokohama; Isao Yoshimi, Mobara, all of Japan

[73] Assignees: Hitachi, Ltd.; Hitachi Mizusawa Elec. Co Ltd, both of Tokyo, Japan

[21] Appl. No.: 564,609

[22] Filed: Aug. 9, 1990

[30] Foreign Application Priority Data

Aug. 25, 1989 [JP] Japan ................... 1-217375
Feb. 7, 1990 [JP] Japan ................... 2-026050

[51] Int. Cl.⁵ .................... H01J 29/70; H01J 29/76
[52] U.S. Cl. ....................... 315/368.11; 313/412
[58] Field of Search ................. 315/368; 313/412

[56] References Cited

U.S. PATENT DOCUMENTS

| 4,027,219 | 5/1977 | Van Alphen et al. | 315/368 |
| 4,227,122 | 10/1980 | Fujisawa et al. | 315/368 |
| 4,642,527 | 2/1987 | Takahashi et al. | 315/368 |
| 4,961,021 | 10/1990 | Oguro et al. | 315/368 |

Primary Examiner—Theodore M. Blum
Attorney, Agent, or Firm—Antonelli, Terry, Stout & Kraus

[57] ABSTRACT

A ring magnetic sub-core having a plurality of protrusions inside is disposed adjacent to an electron gun side of a main magnetic core on which a horizontal deflection coil and a vertical deflection coil are wound, and an auxiliary vertical deflection coil connected with said vertical deflection coil is wound around said magnetic sub-core, thereby making it possible to have both improvement of convergence performance and reduction of barrel distortion be consistent with each other. Further, a convergence coil is wound around said magnetic sub-core so as to correct a transverse raster or a longitudinal raster.

10 Claims, 15 Drawing Sheets

F I G. 4A
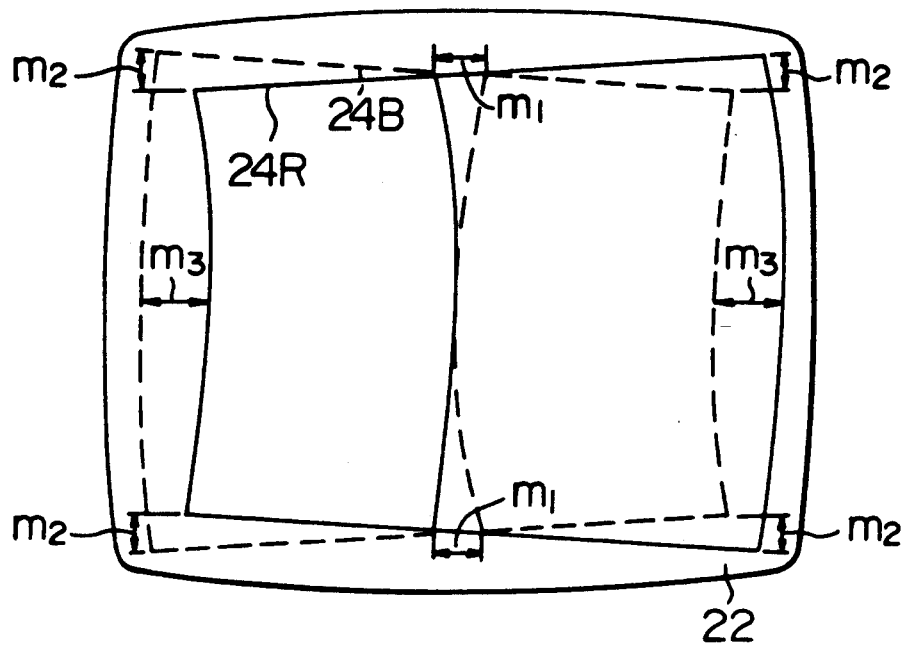
F I G. 4B
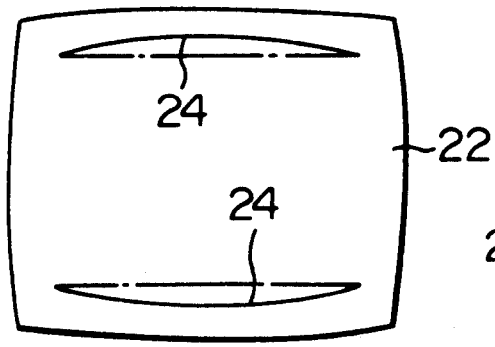
F I G. 4C
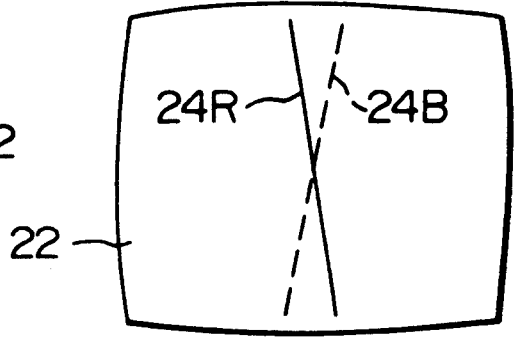

F I G. 15A
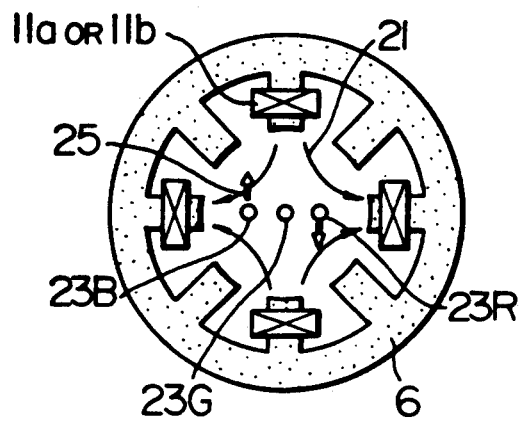
F I G. 15B
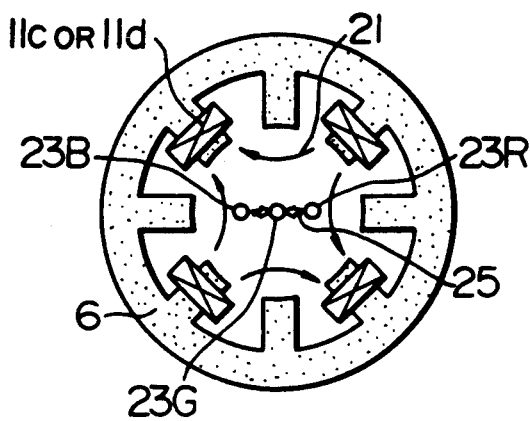
F I G. 15C
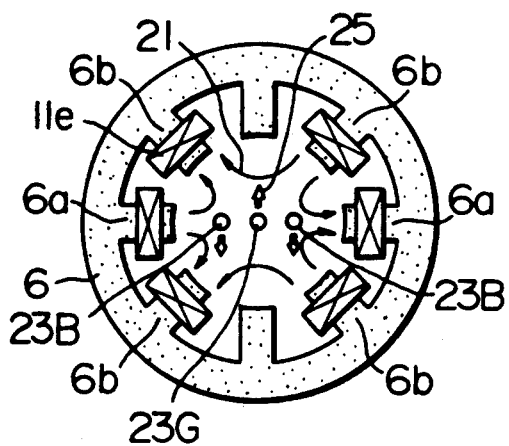
F I G. 15D
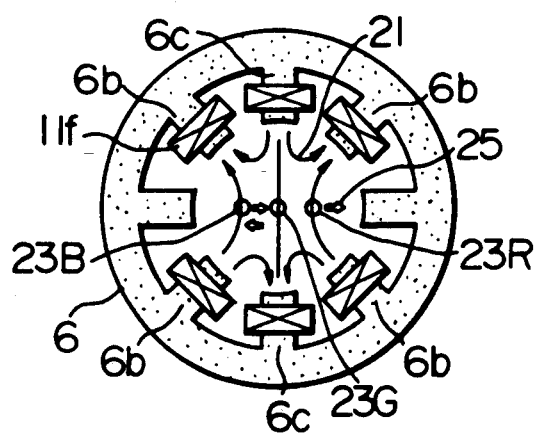
F I G. 15E
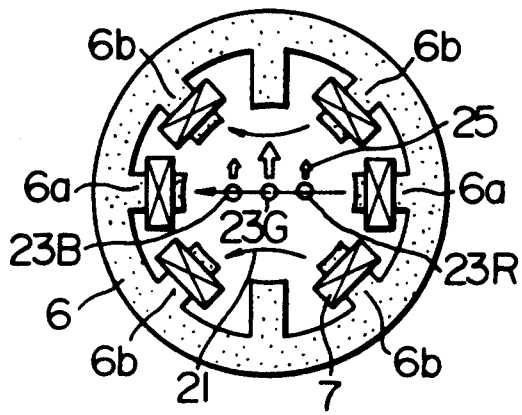

F I G. 23A
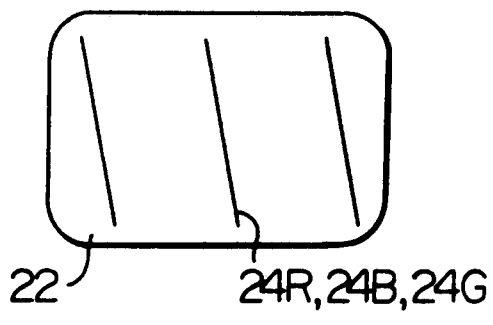
22  24R,24B,24G
F I G. 23B
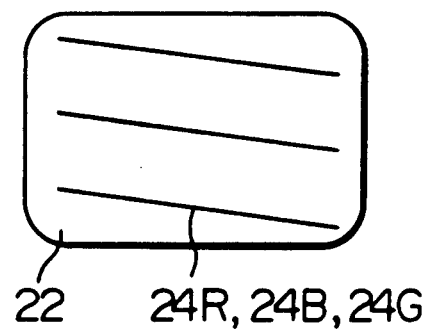
22  24R,24B,24G
F I G. 23C
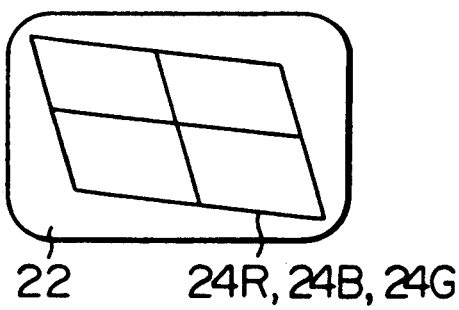
22  24R,24B,24G

DEFLECTION YOKE

BACKGROUND OF THE INVENTION

The present invention relates to a deflection yoke for mounting on a color cathode ray tube and more particularly to a deflection yoke provided with a convergence correction means.

In a conventional device, E-shaped and U-shaped magnetic substances were disposed on an electron gun side of a deflection yoke and vertical auxiliary coils applied with a vertical deflecting current were wound on the above-described respective magnetic substances so as to correct various misconvergences as described in JP-A-63-143727.

In an apparatus according to another prior art, a dynamic convergence correction means consisting of coils which were wound around eight pieces of magnetic cores arranged being apart from each other on concentric circles with respect to a tube axis was held on a self-convergence deflection yoke as described in JP-A-57-180286.

In abovesaid prior art, the configuration of the magnetic substance on which a vertical auxiliary coil is wound is not a ring shape. Accordingly, the operation of shielding a horizontal deflecting magnetic field was weak, and, when a horizontal deflection coil and a vertical coil were formed in a saddle form having little leakage magnetic field, improvement of convergence performance has been inconsistent with reduction of barrel-shaped image distortion (hereafter referred to as barrel distortion).

In addition, correction of cross misconvergence produced between a raster produced by a center beam and a raster produced by a side beam and correction of rotation of a transverse raster or a longitudinal raster have not been made with above-described prior art.

SUMMARY OF THE INVENTION

It is an object of the present invention to provide a deflection yoke which is able to have improvement of convergence performance be consistent with reduction of barrel distortion.

It is another object of the present invention to provide a deflection yoke including a means which corrects cross misconvergence produced between a raster produced by a center beam and a raster produced by a side beam and corrects rotation of a transverse raster or a longitudinal raster.

In order to achieve the above-described objects, a deflection yoke of the present invention is structured in such a manner that a ring-shaped magnetic sub-core having a plurality of protrusions inside is disposed integrally with a main deflection yoke adjacent to the electron gun side of the main deflection yoke consisting of a horizontal deflection coil, a vertical deflection coil and a main magnetic core, and an auxiliary vertical deflection coil connected with the vertical deflection coil is wound around said magnetic sub-core.

Further, in order to achieve the above-described objects, a deflection yoke of the present invention is provided with a convergence coil which deflects at least the center beam on the electron gun side of the deflection yoke in a direction orthogonal to the deflecting direction of the main deflection yoke.

Furthermore, in order to achieve the above-described objects, a convergence coil is wound around said magnetic sub-core, and there is provided a variable transformer composed of a first coil and a second coil in which said first coil is connected with a horizontal deflection coil of the main magnetic core and said second coil is wound around said magnetic sub-cores.

The ring-shaped magnetic sub-core reduces leakage of the horizontal deflection magnetic field by shielding the horizontal deflection magnetic field on the electron gun side of the main deflection yoke, and the auxiliary vertical deflection coil acts so as to intensify the vertical deflection magnetic field on the electron gun side of the main deflection yoke by generation of a correction magnetic field, thus making it easier that improvement of convergence performance is consistent with reduction of the barrel distortion in the deflection yoke in which the horizontal deflection yoke and the vertical deflection yoke are formed in a saddle shape.

On the other hand, a convergence coil which deflects the electron beam in a direction orthogonal to the main deflecting direction is provided, and cross misconvergence is corrected by applying a deflection force by components that are different from each other with respect to the center beam and the side beam and the rotation of the longitudinal raster or the transverse raster is corrected by applying a deflection force by components that are the same with respect to the center beam and the side beam.

Also, the variable transformer generates a current almost similar to the horizontal deflection current in the second coil connected with the convergence coil by connecting the horizontal deflection coil with the first coil and supplying a horizontal deflection current thereto, resulting in that, for example, cross misconvergence between the transverse raster formed by the center electron beam and the transverse raster formed by the side electron beam is corrected by means of the correction magnetic field produced by the convergence coil.

BRIEF DESCRIPTION OF THE DRAWINGS

FIG. 4A and FIG. 4C are pattern diagrams showing misconvergence on a phosphor screen;

FIG. 4B is a pattern diagram showing image distortion on a phosphor screen;

FIG. 15A through 15E show front views of principal parts for explaining the operation of the present invention;

FIG. 23A through 23C show pattern diagrams showing the rotation of a raster on a phosphor screen in the sixth embodiment.

EXPLANATION OF SYMBOLS

Figure 1A:
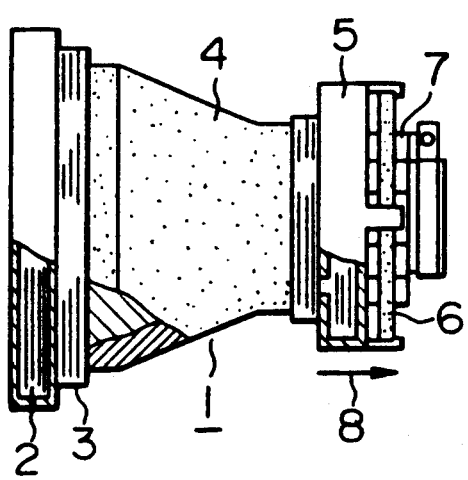
FIG. 1A and FIG. 1B are a side view and a rear view respectively showing a first embodiment of a deflection yoke of the present invention.

1 ... deflection yoke
2 ... horizontal deflection coil
3 ... vertical deflection coil
4 ... main magnetic core
5 ... separator
6, 6a, 6b, 6c, 6d, 6e, 6f, 6g, 6h ... magnetic sub-cores
7, 7a, 7b, 7c, 7d, 7e, 7f ... auxiliary vertical deflection coils
8 ... electron gun side
10a, 10b ... variable resistors
11, 11a, 11b, 11c, 11d, 11e, 11f ... convergence coils
12 ... variable transformer
13 ... movable axis
14 ... magnetic core
15, 15a, 15b ... first coils
16 ... second coil
17, 17a, 17b ... coil bobbins
18 ... convergence apparatus
21a, 21b ... magnetic force lines
23R, 23G, 23B ... electron beams
24, 24R, 24G, 24B ... rasters
25 ... deflection force
26 ... magnetic piece

DESCRIPTION OF THE PREFERRED EMBODIMENTS

Embodiments of the present invention will be described hereafter with reference to the drawings.

Figure 1B:
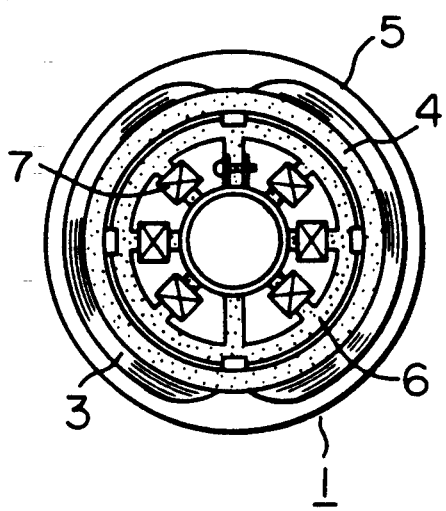
Figure 2:
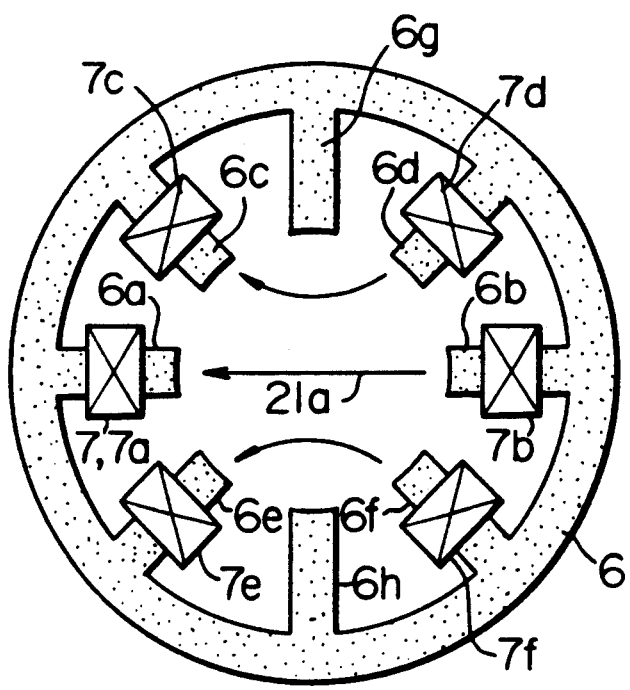
FIG. 2 is a front view of a magnetic subcore.
Figure 3:
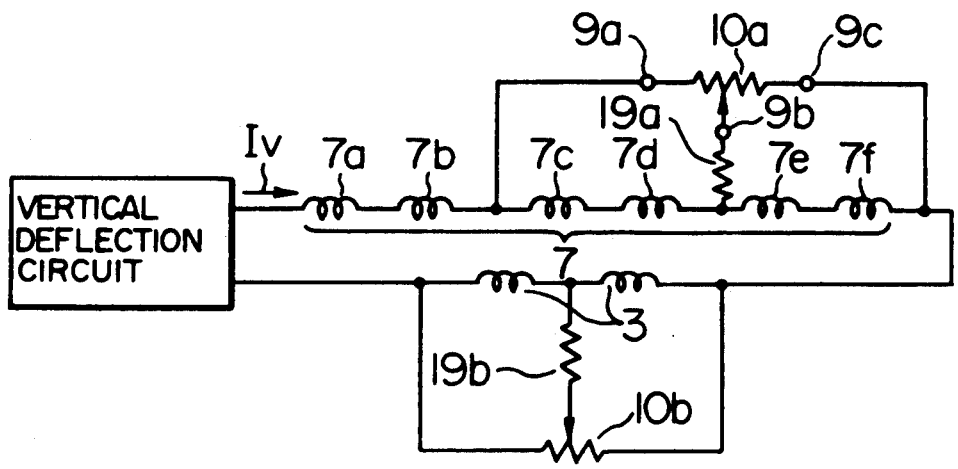
FIG. 3 is a circuit diagram of the embodiment shown in FIG. 1.

FIG. 1A, FIG. 1B and FIG. 2 are a side view, a rear view and a front view of a principal part of a magnetic sub-core showing a first embodiment of a deflection yoke of the present invention, respectively. In the abovesaid respective figures, a numeral 1 indicates a deflection yoke, 2 indicates a horizontal deflection coil, 3 indicates a vertical deflection coil, 4 indicates a main magnetic core composed of a magnetic substance, 5 indicates a separator, 6 indicates a ring magnetic sub-core composed of a magnetic substance and having eight protrusions, and 7 indicates an auxiliary vertical deflection coil connected to the vertical deflection coil 3. The horizontal deflection coil 2 and the vertical deflection coil 3 are each formed in a saddle shape. Also, on an electron gun side 8 of the horizontal deflection coil 2, the magnetic sub-core 6 is disposed adjacent thereto, and the auxiliary vertical deflection coil 7 is composed of coils 7a, 7b, 7c, 7d, 7e and 7f which are wound around protrusions 6a, 6b, 6c, 6d, 6e and 6f of said magnetic sub-core 6. FIG. 3 shows a connection diagram of the vertical deflection coil 3 and the auxiliary vertical deflection coils 7a, 7b, 7c, 7d, 7e and 7f in the present invention. By supplying a vertical deflection current $I_V$ to the auxiliary vertical deflection coil 7 after making connection as shown in FIG. 3, a correction magnetic field 21a in the same direction as the vertical deflection magnetic field and having a pincushion form is generated inside the magnetic sub-core 6 as shown in FIG. 2. Besides, the configuration of the correction magnetic field 21a can be adjusted easily by varying the ratio of the number of turns of the auxiliary vertical deflection coils 7a and 7b on the left and right sides to the number of turns of the auxiliary vertical deflection coils 7c, 7d, 7e and 7f on the diagonals.

On the other hand, in a composition of only a main deflection yoke 1 consisting of the horizontal deflection coil 2, the vertical deflection coil 3 and the main magnetic core 4, the sum total of misconvergences $m_1$, $m_2$ and $m_3$ in the directions as shown in FIG. 4A takes a positive value due to the fact that each of the deflection coils 2 and 3 has a saddle shape as to misconvergence between rasters 24R and 24B formed by side electron beams 23R and 23B such as shown in FIG. 4A. On the contrary, it is possible to intensify the vertical deflection magnetic field on the electron gun side 8 of the deflection yoke 1 and to change misconvergence $m_1$ and $m_2$ such as shown in FIG. 4A so as to reduce the sum total of $m_1$, $m_2$ and $m_3$ by providing the auxiliary vertical deflection coil 7 as shown in the present embodiment. In general, when the vertical deflection magnetic field is intensified and misconvergences $m_1$ and $m_2$ are varied, a barrel distortion is produced on upper and lower transverse rasters 24 as shown in FIG. 4B. In FIG. 4B, 22 indicates a phosphor screen, and 24 shows a barrel distortion. Thereupon, in the present invention, the horizontal deflection magnetic field is attenuated on the electron gun side 8 of the deflection yoke 1 by forming the magnetic sub-core 6 in a ring shape and thus shielding the horizontal deflection magnetic field, and the misconvergence $m_2$ and $m_3$ shown in FIG. 4A are varied, thereby to reduce the sum total of $m_1$, $m_2$ and $m_3$. Thus, the sum total of $m_1$, $m_2$ and $m_3$ can be made zero in the present invention even if the correction magnetic field 21a generated by the auxiliary vertical deflection coil 7 is feeble. Therefore, it is possible to make the sum total of $m_1$, $m_2$ and $m_3$ zero without increasing the barrel distortion of upper and lower transverse rasters 24.

Figure 5:
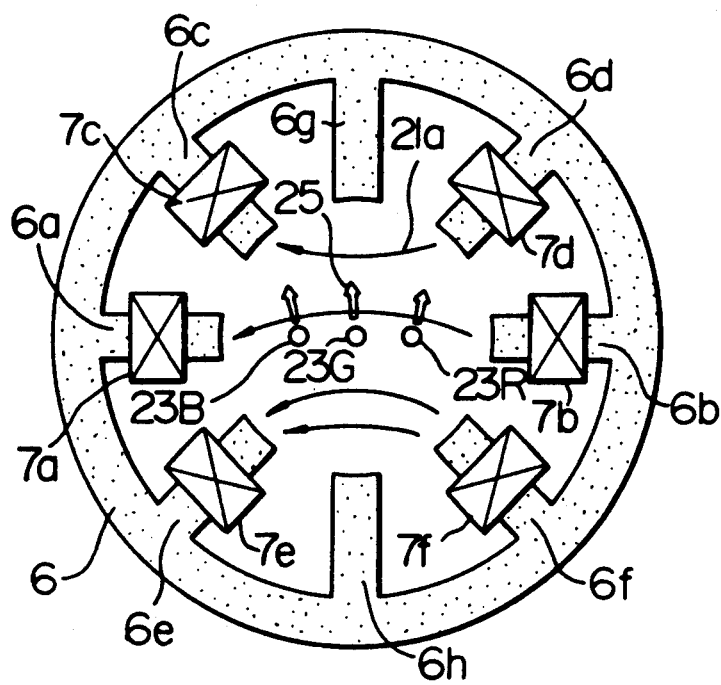
FIG. 5 is a front view of a principal part for explaining the operation of the embodiment shown in FIG. 1.

Next, the circuit of the vertical deflection coil 7 in the present invention will be described with reference to FIG. 3. The present invention is featured by a variable resistor 10a connected for the purpose of adjusting the ratio of the current applied to the auxiliary vertical deflection coils 7c and 7d disposed on the upper side to the current applied to the auxiliary vertical deflection coils 7e and 7f disposed on the lower side as shown in FIG. 3. For example, when the variable resistor 10a is adjusted so that the resistance value between a terminal 9a and a terminal 9b is made smaller than the resistance value between a terminal 9b and a terminal 9c, such an effect is obtainable that the magnetic field 21a generated by the auxiliary vertical deflection coil 7 is deformed as shown in FIG. 5, and cross misconvergence between longitudinal rasters 24R and 24B formed by side electron beams 23R and 23B produced due to manufacturing errors such as that shown in FIG. 4C is corrected. Also, in FIG. 3, 19a and 19b indicate current limiting resistors, and 10b indicates a variable resistor.

Figure 6A:
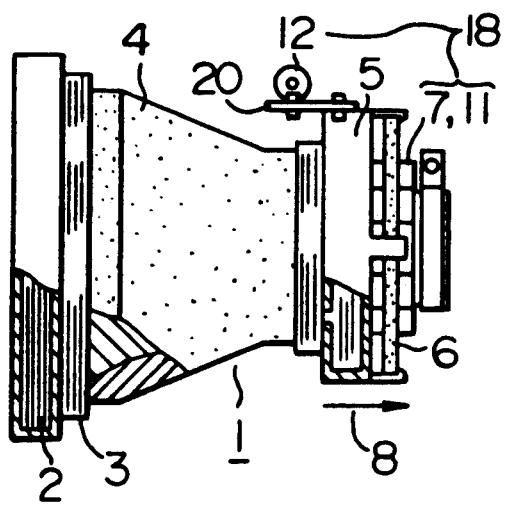
FIG. 6A and FIG. 6B are a side view and a rear view showing a second embodiment of a deflection yoke of the present invention.
Figure 6B:
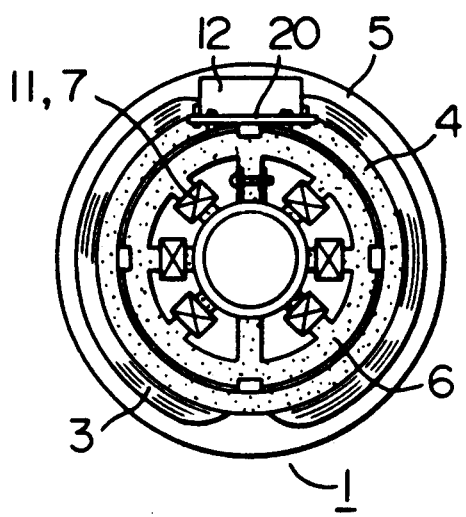
Figure 7:
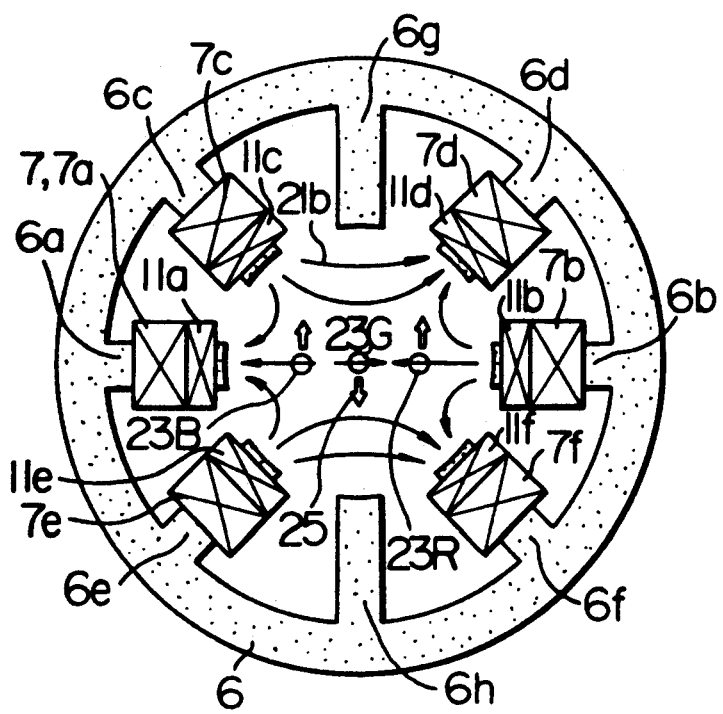
FIG. 7 is a front view of a principal part of a magnetic sub-core.

In the next place, a second embodiment of the present invention will be described. FIG. 6A, FIG. 6B and FIG. 7 show a side view, a rear view and a front view of a principal part showing a second embodiment of the present invention, respectively. In these figures, those parts that have the same functions a those shown in FIG. 1A, FIG. 1B and FIG. 2 are assigned with the same numbers. In the present embodiment, the difference from the first embodiment exists in that a convergence coil 11 for generating a six-pole magnetic field 21b and a variable transformer 12 for supplying a correction current to the convergence coil 11 are provided. In these figures, 20 indicates a terminal board for holding the variable transformer 12.

As shown in FIG. 7, the convergence coil 11 is composed of coils 11a and 11b wound around protrusions 6a and 6b on left and right sides of the magnetic subscore 6 and coils 11c, 11d, 11e and 11f wound around protrusions 6c, 6d, 6e and 6f on diagonal sides of the magnetic sub-core 6. Furthermore, the ratio of the number of turns of the coils 11a and 11b to the number of turns of the coils 11c, 11d, 11e and 11f is made to be approximately 5 to 9. Thus, as shown in FIG. 7, the convergence coil 11 generates a 6-pole magnetic field 21b which acts in reverse directions with respect to the center electron beam 23G and side electron beams 23R and 23B.

Figure 8:
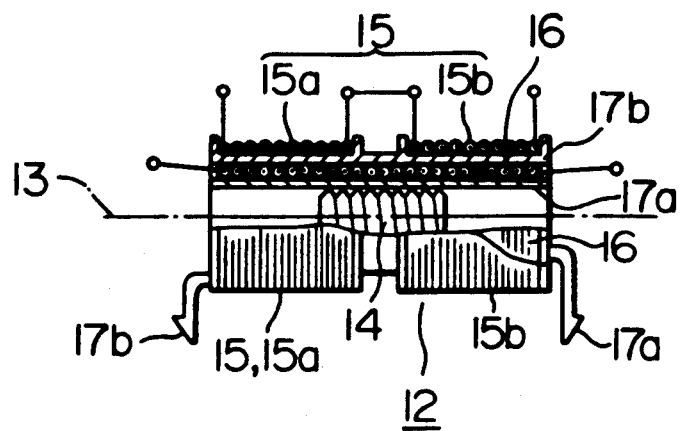
FIG. 8 is a sectional view of a variable transformer which is connected with a convergence coil.

On the other hand, in the variable transformer 12, a first coil 15 and a second coil 16 are wound concentrically with respect to a movable axis 13 of a magnetic core 14 formed in a screw shape as shown in FIG. 8. 17a and 17b indicate coil bobbins, respectively. Further, the first coil 15 is composed of a coil 15a of a first set and a coil 15b of a second set which are split into two sets in the direction of the movable axis 13, and is formed so that the current directions in the coil 15a of the first set and the coil 15b on the second set are reverse to each other. That is, the coil 15a of the first set and the coil 15b of the second set produce mutual inductance which is negative with respect to each other.

Figure 9:
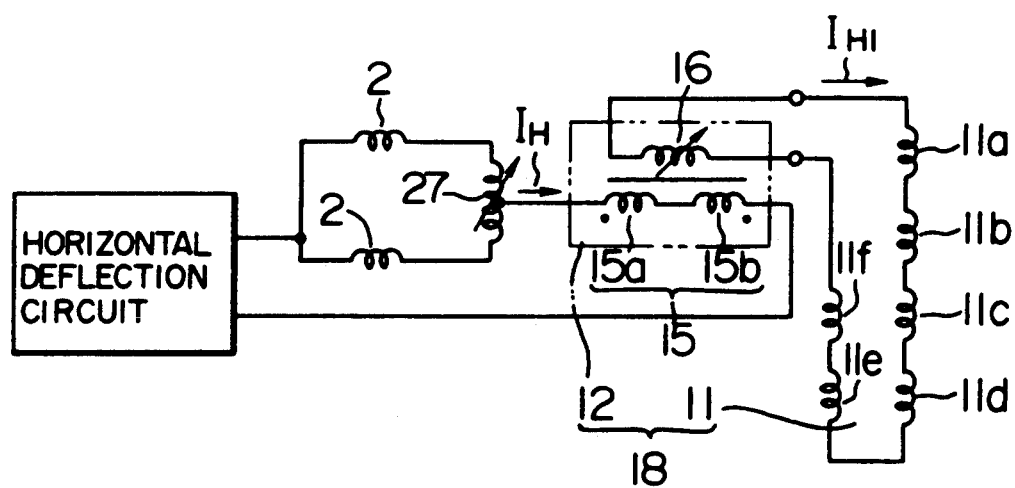
FIG. 9 is a connection diagram of the variable transformer and the convergence coil.

FIG. 9 shows a connection circuit diagram of convergence coils 11a, 11b, 11c, 11d, 11e and 11f and the variable transformer 12. The horizontal deflection coil 2 is connected with a variable inductor 27, and is further connected in series with first coils 15a and 15b of the variable transformer 12. Thus, a horizontal deflection current $I_H$ is supplied to the first coil 15a and 15b of the variable transformer 12. Further, since the second coil 16 of the variable transformer 12 and the convergence coils 11a, 11b, 11c, 11d, 11e and 11f are connected with each other, it is possible to supply a correction current $I_{H1}$ which is approximately same as the horizontal deflection current $I_H$ to the second coil 16 of the variable transformer 12 and the convergence coil 11 by the action of the variable transformer 12. Also, it is possible to vary the correction current $I_{H1}$ by moving the magnetic core 14 of the variable transformer 12. When the magnetic core 14 is positioned at the central part of the variable transformer 12, the correction current $I_{H1}$ becomes almost zero, the correction current $I_{H1}$ may be made larger as the magnetic core is moved within a certain range from the central part, and the polarity of the correction current $I_{H1}$ can be changed by inverting the movement direction. Here, a convergence apparatus 18 is composed of the convergence coil 11 and the variable transformer 12 which is a means of supplying the correction current $I_{H1}$ to the convergence coil 11.

Figure 10:
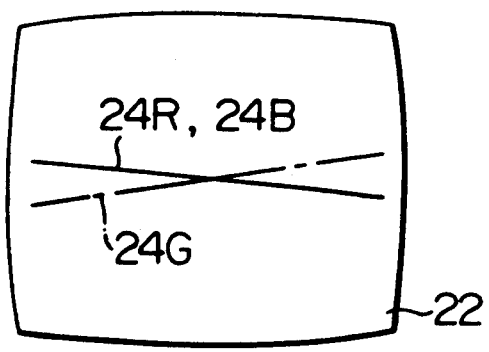
FIG. 10 is a pattern diagram showing misconvergence of a transverse raster on a phosphor screen.

Accordingly, it is possible to correct cross misconvergence between a transverse raster 24G formed by a center electron beam 23G and transverse rasters 24R and 24B formed by side electron beams 23R and 23B such that as that shown in FIG. 10 which is caused by a manufacturing error by forming the 6-pole magnetic field 21b as shown in FIG. 7 which varies the intensity thereof in synchronization with horizontal deflection by the convergence coil 11 and generating a deflection force 25 in the reverse direction by means of the center electron beam 23G and the side electron beams 23R and 23B as shown in FIG. 7. In FIG. 7, the 6-pole magnetic field 21b which is formed when the electron beam is deflected horizontally to the right side on the phosphor screen is shown.

Figure 11:
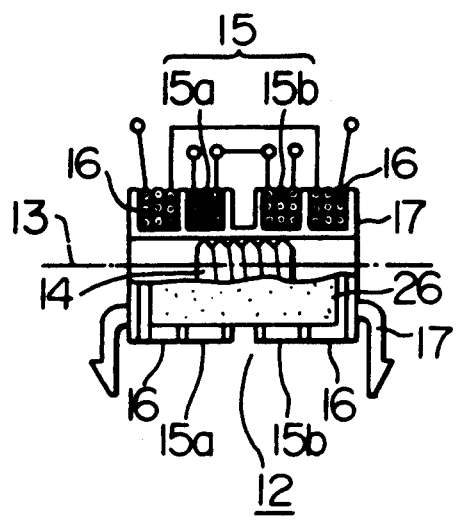
FIG. 11 shows another example of the variable transformer which is connected with the convergence coil.

FIG. 11 shows another embodiment of the variable transformer 12 according to the present invention, and those parts that have same functions as in FIG. 8 are assigned with the same numbers. In the present embodiment, differences from FIG. 8 exist in that the first coils 15a and 15b and the second coil 16 are split in the direction of the movable axis 13 of the magnetic core 14 and are wound around one piece of coil bobbin 17, and that a magnetic piece 26 is added to the outer circumferential portion of the variable transformer 12. In case the first coils 15a and 15b and the second coil 16 are composed as being set apart in the direction of the movable axis 13 as in the present embodiment, it is also possible to strengthen magnetic coupling of the first coils 15a and 15b and the second coil 16 by providing the magnetic piece 26 on the outer circumferential portion, thereby to increase the output on the secondary side of the variable transformer.

Figure 12:
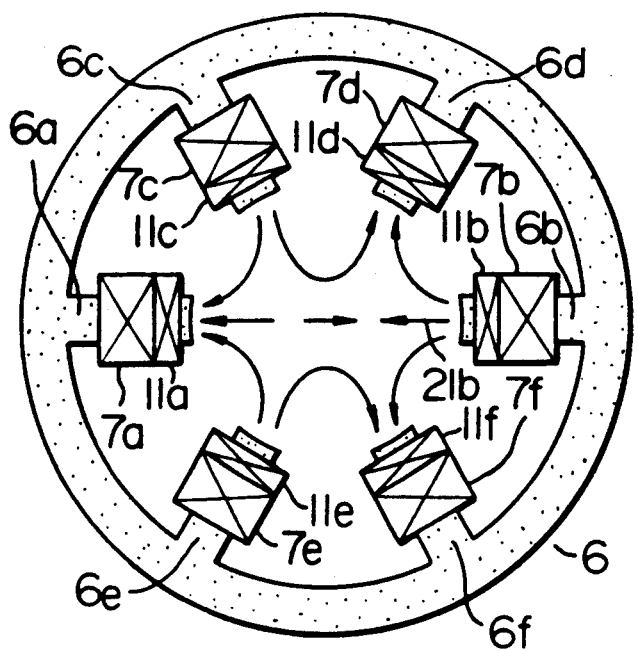
FIG. 12 is a front view of a principal part of a magnetic sub-core showing a third embodiment of the present invention.

Next, a third embodiment of the present invention will be described with reference to FIG. 12. In FIG. 12, those parts that have the same functions as in FIG. 7 are assigned with the same numbers. Further, in FIG. 12, an example of the correction magnetic field 21b generated by the convergence coil 11 is shown. The magnetic sub-core 6 in the present embodiment is featured by that it is formed into a ring shape having six protrusions 6a, 6b, 6c, 6d, 6e and 6f. In this case, the pincushion configuration of the magnetic field produced by the auxiliary vertical deflection coils 7c, 7d, 7e and 7f and the convergence coils 11c, 11d, 11e and 11f wound around protrusions 6c, 6d, 6e and 6f on diagonals is intensified as compared with FIG. 7. Accordingly, it is possible to form a correction magnetic field which is almost equivalent to that shown in FIG. 7 by reducing the numbers of turns of respective coils.

Besides, the first coil 15 of the variable transformer 12 was composed of two sets of coils 15a and 15b so as to produce mutual inductance which is negative with respect to each other and the second coil 16 was composed of one set of coils in the above-described explanation. However, the first coil 15 and the second coil 16 may be composed in a reverse manner to the above, and it is also possible in this case to adjust the correction quantity of the convergence coil 11 connected to the second coil 16 by using the variable transformer 12. In addition, the composition of the convergence coil connected to the variable transformer and the misconvergence which is corrected by the convergence coil are not limited to the present invention in a convergence apparatus provided with a variable transformer. Furthermore, any electronic component may be connected with the variable transformer in point of the composition.

Next, a fourth embodiment of the present invention will be described with reference to the drawings.

Figure 13:
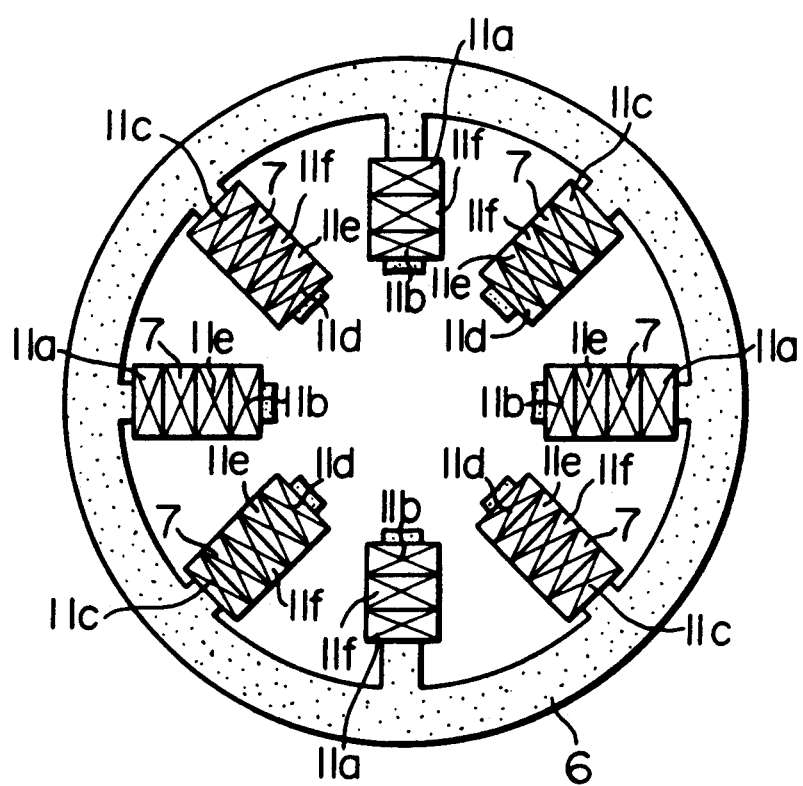
FIG. 13 is a front view of a principal part of a magnetic sub-core showing a fourth embodiment of the present invention.

FIG. 13 shows a fourth embodiment of the present invention. Those parts that are the same as in FIG. 7 are assigned with the same numbers in FIG. 13. Numeral 7 indicates an auxiliary vertical deflection coil connected with the vertical deflection coil 3, and 11 indicates a convergence coil. Here, the convergence coil 11 is composed of convergence coils 11a, 11b, 11c and 11d which generate a 4-pole magnetic field and convergence coils 11e and 11f which generate a 6-pole magnetic field.

Figure 14:
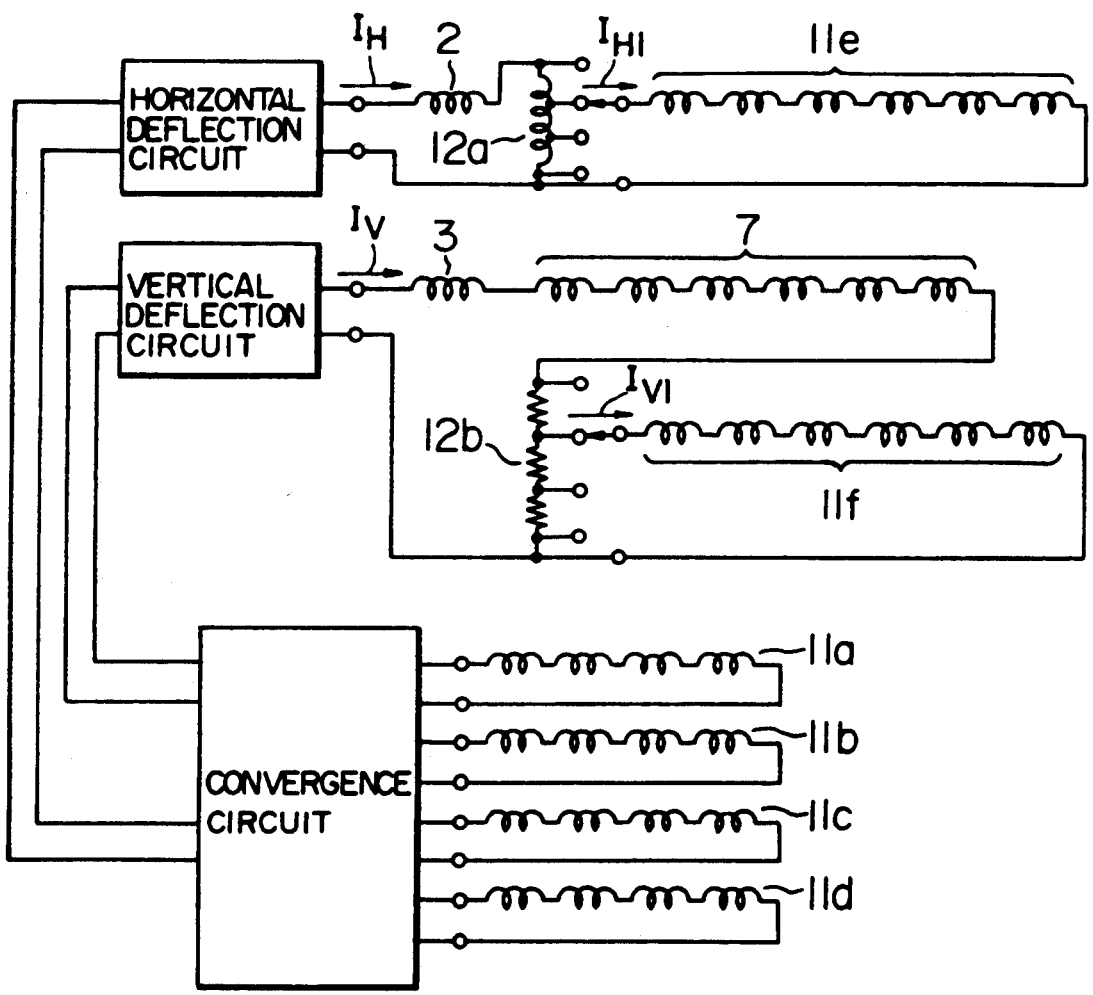
FIG. 14 is a circuit diagram of the fourth embodiment.

FIG. 14 shows a connection diagram of the abovesaid convergence coils 11a, 11b, 11c, 11d, 11e and 11f and the auxiliary vertical deflection coil. As shown in FIG. 14, the convergence coil 11e is connected with a horizontal deflection output and the convergence coil 11f and the auxiliary vertical deflection coil 7 are connected with a vertical deflection output, respectively. Furthermore, the convergence coils 11a through 11d are connected with a convergence circuit which is connected with the horizontal deflection output and the vertical deflection output, respectively.

FIG. 15A through FIG. 15E show magnetic fields produced by respective convergence coils 11a, 11b, 11c, 11d, 11e and 11f and the auxiliary vertical deflection coil 7. In these figures, 21 indicates a magnetic force line, and 23R, 23G and 23B indicate electron beams. First, as shown in FIG. 15A, the convergence coil 11a applied with a d.c. current and the convergence coil 11b applied with a dynamic correction current generate 4-pole magnetic fields 21 that have opposite directions to each other in the horizontal direction with respect to the side beams 23R and 23B, and produce a deflection forces 25 in the vertical direction. Accordingly, the convergence coil 11a conducts static convergence in the vertical direction between the side beams 23R and 23B, and the convergence coil 11b conducts dynamic convergence in the vertical direction between the side beams 23R and 23B. Further, as shown in FIG. 15B, the convergence coil 11c applied with a d.c. current and the convergence coil 11d applied with a dynamic correction current generate 4-pole magnetic fields 21 that have opposite directions to each other in the vertical direction, and produce deflection force 25 in the horizontal direction. Thus, the convergence coil 11c conducts static convergence in the horizontal direction between the side beams 23R and 23B, and the convergence coil 11d conducts dynamic convergence in the horizontal direction between the side beams 23R and 23B.

Figure 16A:
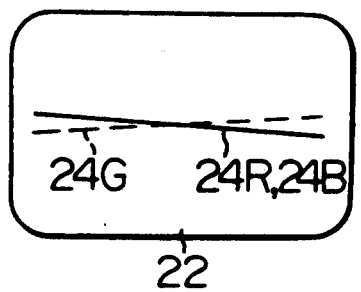
FIG. 16A through 16C show pattern diagrams showing misconvergence on the phosphor screen.

On the other hand, in the convergence coil 11e shown in FIG. 15C, the number of turns wound around the protrusions 6a on the horizontal axis is made less than $\sqrt{2}$ times the number of turns wound around the protrusions 6b on the diagonal axes. Thus, as shown in FIG. 14, horizontal magnetic fields 21 having opposite directions to each other in the horizontal direction are generated by the center beam 23G and the side beams 23R and 23B as shown in FIG. 15C by dividing the horizontal deflection current $I_H$ using a variable inductor 12a and supplying a current $I_{H1}$ to the convergence coil 11e, thus producing the vertical deflection force 25 having an opposite direction in the horizontal direction by the center beam 23G and the side beams 23R and 23B. Accordingly, the convergence coil 11e acts to correct cross misconvergence of the transverse raster 24G by the center beam and the transverse rasters 24R and 24B by the side beams such as that shown in FIG. 16A.

Figure 16B:
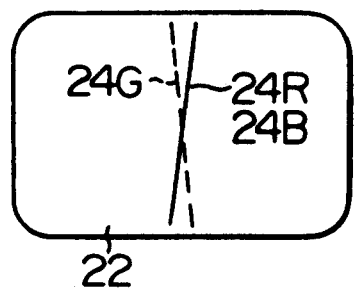

Also, in the convergence coil 11f shown in FIG. 15D, the number of turns wound around the protrusions 6c on the vertical axis is made larger than $\sqrt{2}$ times the number of turns wound around the protrusion 6b on the diagonal axes. Vertical magnetic fields 21 having opposite directions to each other in the vertical direction are generated by the center beam 23G and the side beams 23R and 23B as shown in FIG. 15D by dividing a vertical deflection current $I_V$ using a resistor 12b and supplying a current $I_{V1}$ to the convergence coil 11f as shown in FIG. 14, thus producing horizontal deflection forces 25 having opposite directions in the horizontal direction by the center beam 23G and the side beams 23R and 23B. Accordingly, the convergence coil 11f acts to correct cross misconvergence of the longitudinal raster 24G by the center beam and the longitudinal rasters 24R and 24B by the side beams such as that shown in FIG. 16B.

Figure 16C:
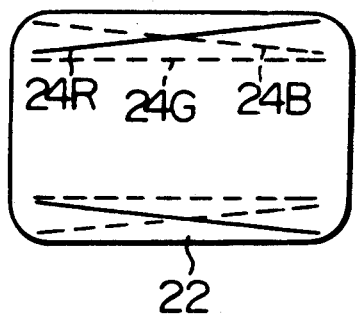

Furthermore, the auxiliary vertical deflection coil 7 forms the correction magnetic fields 21 of the vertical deflection magnetic field as shown in FIG. 15E by being connected with the vertical deflection coil 3 and applied with the vertical deflection current $I_V$ as shown in FIG. 14. By means of above-described correction magnetic fields 21, it is possible to correct misconvergence such as that shown in FIG. 16C and have the deflection yoke conduct self-convergence easily.

Therefore, according to the present invention, it is possible to perform magnetic field correction for self-convergence and convergence correction independent of the deflection yoke in the space provided with the magnetic sub-core 6.

Figure 17:
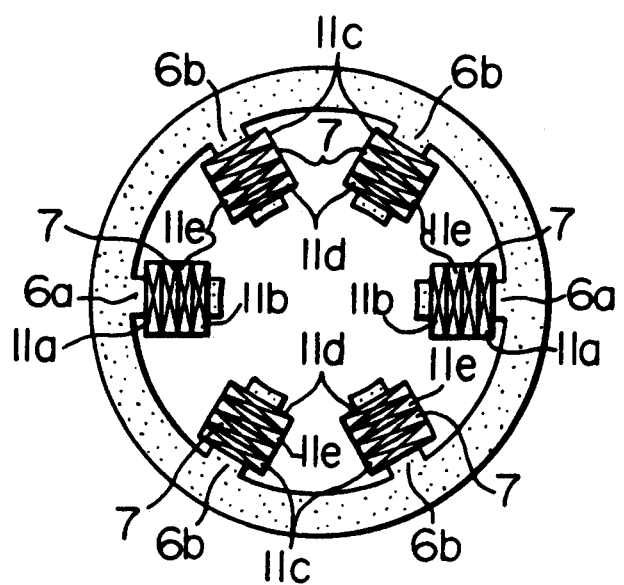
FIG. 17 is a front view of a principal part showing a fifth embodiment of the present invention.
Figure 18A:
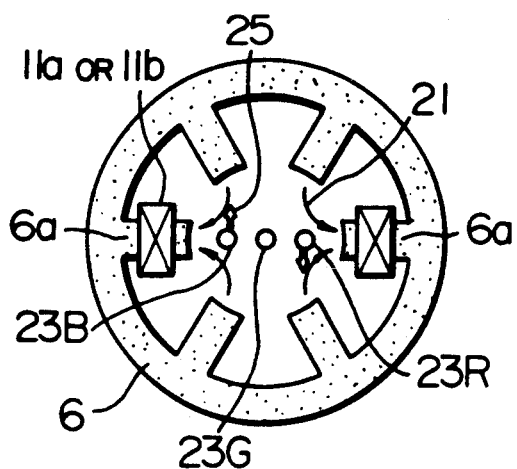
FIG. 18A through 18D show front views of principal parts for explaining the operation of the fifth embodiment.
Figure 18B:
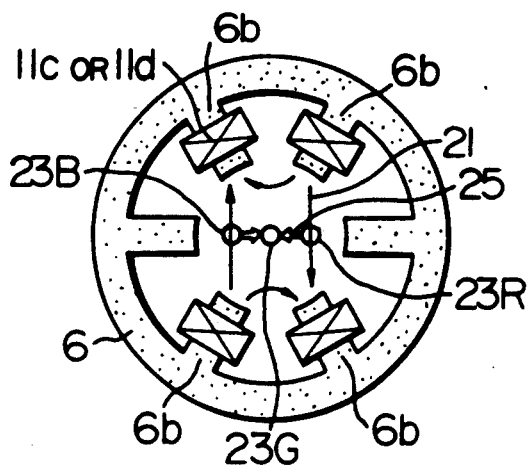
Figure 18C:
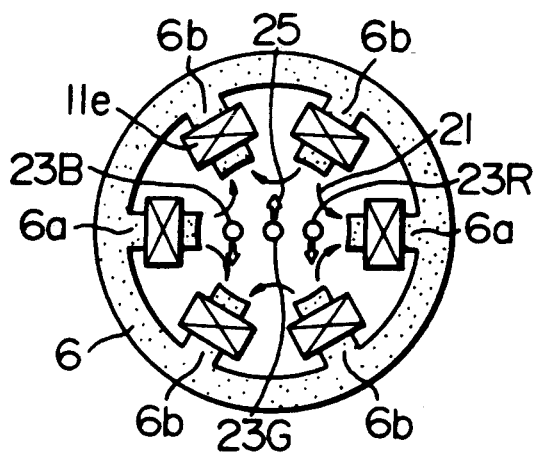
Figure 18D:
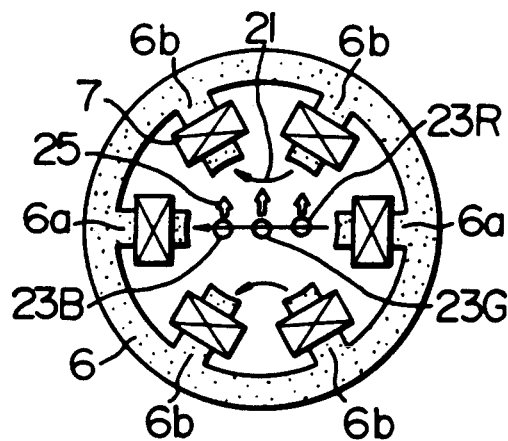

FIG. 17 shows a fifth embodiment of the present invention, in which a sub-deflection yoke 6 provided on the electron gun side of the main deflection yoke 1 is shown similarly to FIG. 6A and FIG. 6B. In FIG. 17, those parts that have the same functions as in FIG. 13 are assigned with the same numbers. The present embodiment is different from the fourth embodiment in that there are six protrusions on the ring magnetic sub-core 6 and in that only the convergence coil 11e (no 11f) generates a 6-pole magnetic field.

In FIG. 18A through FIG. 18D, magnetic fields 21 produced by respective convergence coils 11a, 11b, 11c, 11d and 11e and an auxiliary vertical deflection coil 7 are shown. In these drawings, those parts that have the same functions as FIG. 15A through FIG. 15E are assigned with the same numbers. In the convergence coil 11e shown in FIG. 18C, the number of turns wound around the protrusion 6a on the horizontal axis is made less than the number of turns wound around the protrusions 6b on the diagonal axes. Further, deflection forces 25 having opposite directions in the vertical direction are produced by the center beam 23G and the side beams 23R and 23B by supplying the current $I_{H1}$ obtained by dividing the horizontal deflection current $I_H$ to the convergence coil 11e. Accordingly, the convergence coil 11e acts to correct cross misconvergence of the transverse raster 24G by the center beam and the transverse rasters 24R and 24B by the side beams such as that shown in FIG. 16A. Further, the other convergence coils 11a, 11b, 11c and 11d and the auxiliary deflection coil 7 perform the same operations as in as the fourth embodiment.

In the present embodiment, since the number of protrusions of the ring magnetic sub-core 6 is few, there is the advantage that the width of the protrusions may be widened thereby to increase the strength thereof.

Figure 19:
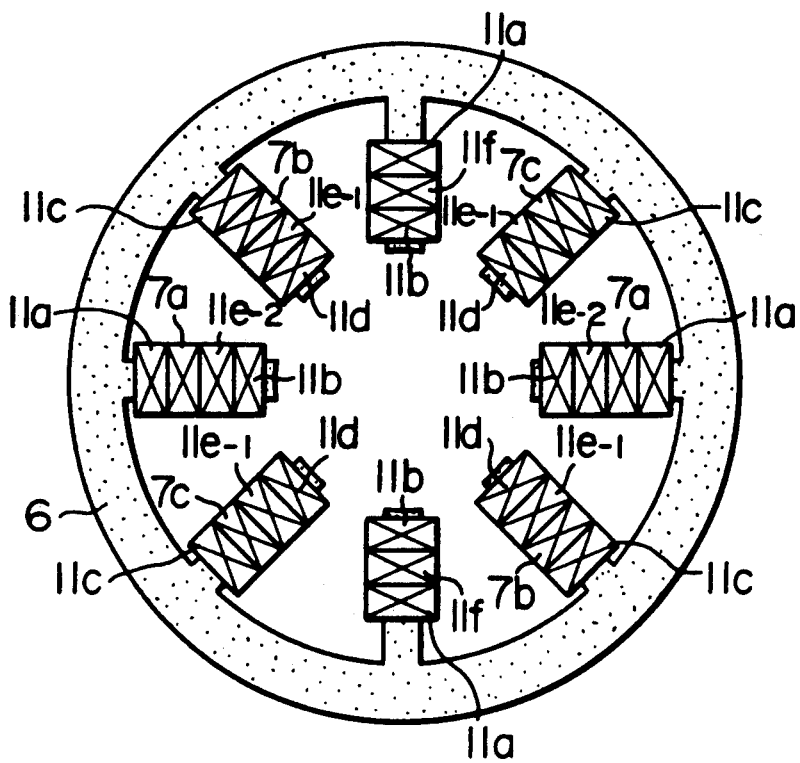
FIG. 19 is a front view of a principal part showing a sixth embodiment of the present invention.
Figure 20:
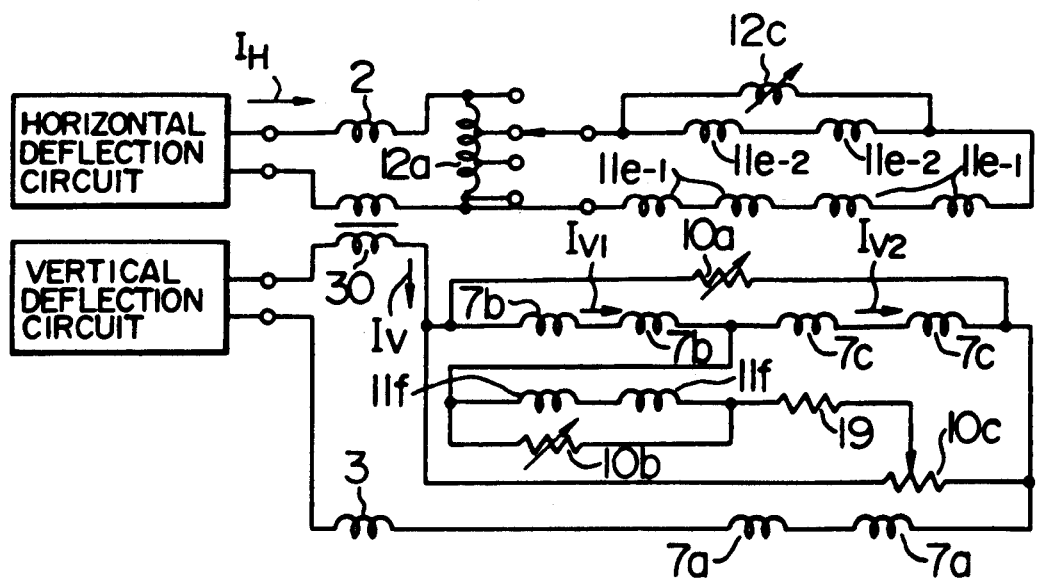
FIG. 20 is a connection diagram of the sixth embodiment.

FIG. 19 shows a sixth embodiment of the present invention, in which a sub-deflection yoke 6 provided on the electron gun side of the main deflection yoke 1 similarly to FIG. 6A and FIG. 6B is shown. FIG. 20 shows a connection diagram of the convergence coils 11e and 11f the auxiliary vertical deflection coil 7. Also, the other convergence coils 11a, 11b, 11c and 11d are connected in a similar manner as FIG. 14 in the present embodiment. In FIG. 19, those parts that have the same functions as those shown in FIG. 13 are assigned with the same numbers. The present embodiment is different from FIG. 13 in that the coil corresponding to the convergence coils 11f disposed at diagonal positions is commonly used with coils 7b and 7c at the diagonal positions of the auxiliary vertical deflection coil. That is, a variable resistor 10c which adjusts differentially currents $I_{V1}$ and $I_{V2}$ applied to the auxiliary vertical deflection coils 7b of a first set and the auxiliary vertical deflection coils 7c of a second set that are disposed at disgonal positions is provided, and the differential current $I_{V1}-I_{V2}$ is divided by a variable resistor 10b so as to adjust the current value, thus applying the adjusted current to the convergence coils 11f of the set in the upper and lower parts. Such an operation will be described with reference to FIG. 21A through FIG. 21E.

Figure 21A:
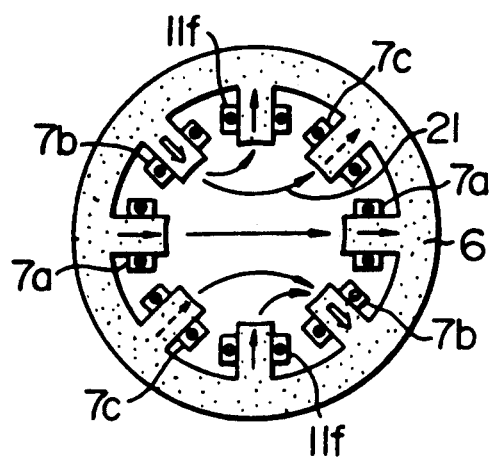
FIGS. 21A through 21E and FIGS. 22A through 22C show front views of principal parts for explaining the operation of the sixth embodiment.
Figure 21B:
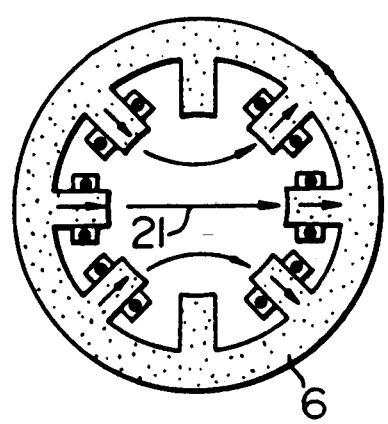
Figure 21C:
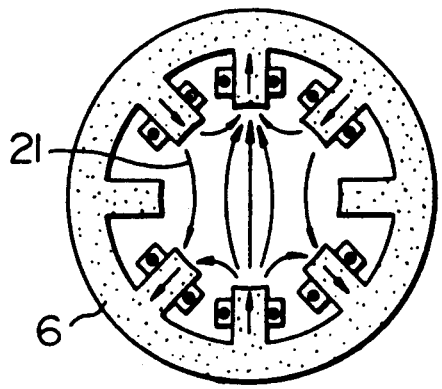
Figure 21D:
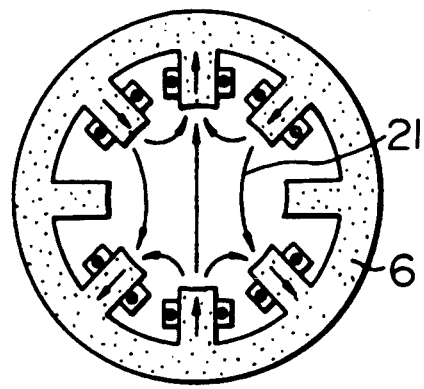
Figure 21E:
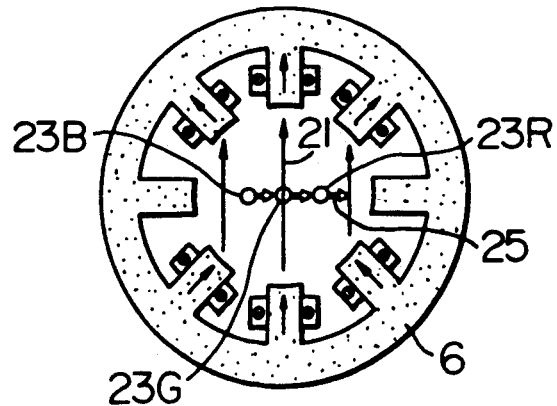

FIG. 21A through FIG. 21E show the operation of the auxiliary vertical deflection coils 7a, 7b and 7c and the convergence coils 11f in the present embodiment. FIG. 21A shows the whole magnetic fields 21 when the variable resistor 10c is adjusted so as to provide $I_{V1}>I_{V2}$, and FIG. 21A can be separated into magnetic field components as shown in FIG. 21B and FIG. 21C. The magnetic field components shown in FIG. 21B correspond to the auxiliary vertical deflection magnetic field components, and cause the deflection yoke to perform self-convergence similarly to FIG. 15E. FIG. 21C shows correction magnetic field components which produce a deflection force in the horizontal direction and can be separated further into magnetic field components shown in FIG. 21D and FIG. 21E. The magnetic field components shown in FIG. 21D have a function to correct cross misconvergence of the longitudinal raster 24G by the center beam and the longitudinal raster 24R by the side beam similarly to FIG. 15D. The magnetic field components shown in FIG. 21E are magnetic field components which act on the center beam and the side beam in the same direction with the same intensity, and act to rotate both the longitudinal raster 24G by the center beam and the longitudinal rasters 24R and 24B by the side beams in the similar manner as shown in FIG. 23A. Thus, it is possible to adjust the misconvergence of the longitudinal raster and the rotation of the longitudinal raster optionally by adjusting the variable resistors 10c and 10b. Moreover, it is possible to change the magnetic field configuration shown in FIG. 21B which is changed by adjusting the variable resistors 10b and 10c by means of the variable resistor 10a connected in parallel with the auxiliary vertical deflection coils 7b and 7c.

Figure 22A:
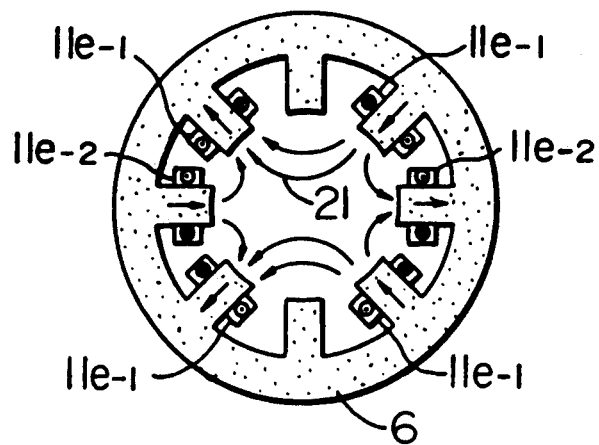
Figure 22B:
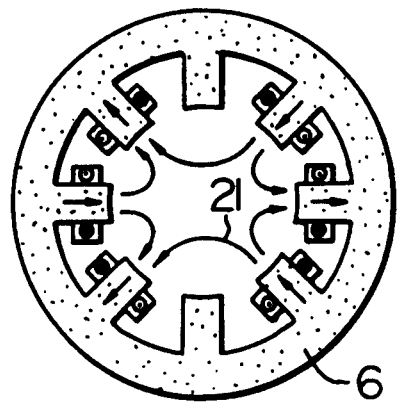
Figure 22C:
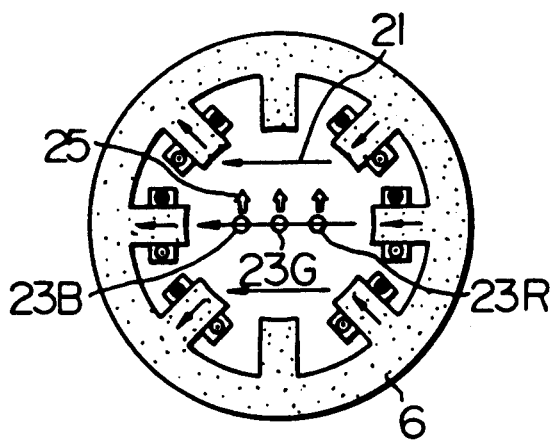

On the other hand, FIG. 22A through FIG. 22C show the operation of convergence coils 11e-1 and 11e-2 in the present embodiment. FIG. 22A shows the whole magnetic field 21 when an inductance value of a variable inductor 12c connected in parallel with the convergence coil 11e-2 is made smaller, and FIG. 22A can be separated into magnetic field components shown in FIG. 22B and FIG. 22C. The magnetic field components shown in FIG. 22B act to correct cross misconvergence of the transverse raster 24G by the center beam and the transverse rasters 24R and 24B by the side beams similarly to FIG. 15C. The magnetic field components shown in FIG. 22B are magnetic field components which act on the center beam and the side beams in the same direction with the same intensity, and also act to rotate both the transverse raster 24G by the center beam and the transverse rasters 24R and 24B by the side beams in the similar manner as shown in FIG. 23B. Moreover, it is possible to adjust a variable inductor 12a and the variable inductor 12c by change-over of the tap of the variable inductor 12a so as to adjust the misconvergence of the transverse raster and the rotation of the transverse raster optionally.

Accordingly, it is possible to correct the dislocation of orthogonality of the transverse raster and the longitudinal raster and the rotation of the whole rasters such as shown in FIG. 23C at the same time by adjusting respective variable resistors 10a, 10b and 10c and respective variable inductors 12a and 12c in the present embodiment. Besides, with this correction, a crosstalk produced in the sub-deflection yoke between the auxiliary vertical deflection coil and the convergence coils 11e-1 to 11e-2 can be corrected through such a connection that the horizontal deflection current $I_H$ is applied to one coil of a transformer 30 having the first coil and the second coil and the vertical deflection current $I_V$ is applied to another coil thereof. Here, the transformer 30 is provided with a core inside the coil so as to be movable, and is structured so that magnetic coupling between the first coil and the second coil may be varied by the movement of the core, thus producing a crosstalk which is reverse to the crosstalk which is produced in the sub-deflection yoke 6 thereby to perform correction by offsetting.

Besides, it has been shown to provide the auxiliary vertical deflection coil 7 on the subdeflection yoke 6 in respective embodiments of the present invention. However, an auxiliary horizontal deflection coil having a composition in which auxiliary vertical deflection coils 7, 7a, 7b, 7c and 7d are replaced by rotating them by 90 degrees may be provided on the sub-deflection yoke 6. At the same time, when variable inductors are connected with auxiliary horizontal deflection coils corresponding to variable resistors 10a, 10b and 10c connected with the auxiliary vertical deflection coil 7, a similar adjusting function is obtainable.

Further, a static convergence coil and a dynamic convergence coil having the same configuration of the generated magnetic field are provided respectively in the above-described respective embodiments of the present invention, but a static convergence correction current and a dynamic convergence correction current may be superposed and applied to one set of convergence coils.

According to the present invention, such effects that are described below are obtainable with the composition as described above.

It is possible to have improvement of convergence performance and reduction of the barrel distortion be consistent with each other by providing a ring magnetic sub-core having a plurality of protrusions inside adjacent to the electron gun side of the deflection yoke and by winding the auxiliary vertical deflection coil around protrusions of the magnetic sub-core.

Furthermore, there is such an effect that cross misconvergence between the transverse raster formed by the center electron beam and the transverse raster formed by the side electron beam may be corrected by winding the convergence coil which deflects the electron beam in the vertical direction in accordance with horizontal deflection around the magnetic sub-core and connecting the convergence coil with the horizontal deflection coil through a variable transformer.

Moreover, there is such an effect that correction of cross misconvergence of the raster by the center beam and the raster by the side beam or rotation of at least one of the longitudinal raster and the transverse raster may be made by providing auxiliary coils which deflect the electron beam in an orthogonal direction to the main deflection direction on the subdeflection yoke.

What is claimed is:

1. A deflection yoke for a color cathode ray tube in which multiple electron beam arranged in line along an electron beam arrangement axis are formed, comprising:
    a ring magnetic sub-core having a plurality of protrusions which extend toward a center axis, said magnetic sub-core being provided adjacent to an electron gun side of a main deflection yoke consisting of a horizontal deflection coil, a vertical deflection coil, and a main magnetic core; and
    auxiliary vertical deflection coils connected in series with said vertical deflection coil and wound around protrusions of said magnetic sub-core, wherein said auxiliary vertical deflection coils generate an uneven vertical sub-deflection magnetic field.

2. A deflection yoke according to claim 1, further comprising a convergence coil connected to said horizontal deflection coil or said vertical deflection coil and wound around protrusions of said magnetic sub-core.

3. A deflection yoke according to claim 2, wherein said convergence coil has six poles, and wherein a current synchronizing with a current flowing in said horizontal deflection coil is applied to said convergence coil so as to generate magnetic fields for moving side beams of the multiple electron beams in a first vertical direction and for moving a center beam of the multiple electron beams in a second vertical direction opposite to the first vertical direction, thereby correcting cross misconvergence between transverse rasters produced by the side beams and a transverse raster produced by the center beam.

4. A deflection yoke according to claim 3, wherein said magnetic sub-core has eight protrusions, and wherein two poles of said convergence coil are disposed on protrusions of the magnetic sub-core located on the electron beam arrangement axis, the multiple electron beams being disposed between the two poles, and the other four poles of the convergence coil are disposed on protrusions of the magnetic sub-core located on two straight lines which are inclined at 45 degrees with respect to the electron beam arrangement axis, the ratio of the number of turns of the two poles to the number of turns of the four poles being set at 5 to 9.

5. A deflection yoke according to claim 2, wherein said convergence coil has six poles, and wherein a current synchronizing with a current flowing in said vertical deflection coil is applied to said convergence coil so as to generate magnetic fields for moving side beams of the multiple electron beams in a first horizontal direction and for moving a center beam of the multiple electron beams in a second horizontal direction opposite to the first horizontal direction, thereby correcting cross misconvergence between longitudinal rasters produced by the side beams and a longitudinal raster produced by the center beam.

6. A deflection yoke according to claim 5, wherein said magnetic sub-core has eight protrusions, and wherein two poles of said convergence coil are disposed on protrusions of said magnetic sub-core located on a straight line which makes a right angle with the electron beam arrangement axis, and the other four poles of the convergence coil are disposed on protrusions of the magnetic sub-core located on two straight lines which are inclined at 45 degrees with respect to the electron beam arrangement axis, the number of turns of said two poles being more than $\sqrt{2}$ times the number of turns of said four poles.

7. A deflection yoke according to claim 2, wherein said convergence coil has six poles, and wherein a variable inductor or a variable resistor is provided at a part of said convergence coil, thereby making at least a deflection quantity in a direction orthogonal to a main deflecting direction with respect to a center beam of the multiple electron beams adjustable.

8. A deflection yoke according to claim 1, wherein said auxiliary vertical deflection coils consist of at least first, second, third, and fourth coils which are wound around four protrusions of the magnetic sub-core located on two straight lines which are inclined at 45 degrees with respect to the electron beam arrangement axis, the first and second coils being wound around two protrusions located on one side of the electron beam arrangement axis, and the third and fourth coils being wound around two protrusions located on the other side of the electron beam arrangement axis, and wherein said first, second, third, and fourth coils and a variable resistor are connected in series in a loop in the order of the first coil, the second coil, the third coil, the fourth coil, and the variable resistor, a point between the second and third coils being connected to a wiper of said variable resistor.

9. A deflection yoke according to claim 1, wherein said auxiliary vertical deflection coils consist of at least first, second, third, and fourth coils which are wound around four protrusions of said magnetic sub-core located on first and second straight lines which are inclined at 45 degrees with respect to the electron beam arrangement axis, the first and second coils being wound around two protrusions located on the first straight line, and the third and fourth coils being wound around two protrusions located on the second straight line, and further comprising two convergence coils which are wound around protrusions of said magnetic sub-core located on a straight line which is orthogonal to the electron beam arrangement axis, wherein said first, second, third, and fourth coils and a variable resistor are connected in series in a loop in the order of the first coil, the second coil, the third coil, the fourth coil, and the variable resistor, and wherein said two convergence coils are connected in series from a point between the second and third coils to a wiper of said variable resistor.

10. A convergence apparatus for a color cathode ray tube in which multiple electron beams arranged in line are formed, comprising:

a horizontal deflection coil;
a convergence coil; and
a variable transformer, the convergence coil being connected to the horizontal deflection coil through the variable transformer;
wherein the variable transformer comprises:
a first coil and a second coil wound coaxially around a magnetic core with respect to a movable axis of the magnetic core, one of said first coil and said second coil being formed of a plurality of coils;
wherein the coils of said plurality of coils are separated from each other along the movable axis, and are connected to each other so as to produce mutual inductance which is negative with respect to each other.

* * * * *